(12) United States Patent  
Fujii

(10) Patent No.: US 7,515,825 B2  
(45) Date of Patent: Apr. 7, 2009

(54) DISPLAY CONTROL DEVICE AND METHOD

(75) Inventor: Takashi Fujii, Sayama (JP)

(73) Assignee: Olympus Imaging Corp., Tokyo (JP)

( * ) Notice: Subject to any disclaimer, the term of this patent is extended or adjusted under 35 U.S.C. 154(b) by 469 days.

(21) Appl. No.: 11/317,850

(22) Filed: Dec. 23, 2005

(65) Prior Publication Data

US 2006/0140620 A1 Jun. 29, 2006

(30) Foreign Application Priority Data

Dec. 27, 2004 (JP) ............................. 2004-377127

(51) Int. Cl.
  *G03B 17/18* (2006.01)
  *H04N 5/222* (2006.01)
(52) U.S. Cl. .................. 396/287; 348/333.01
(58) Field of Classification Search ................ 396/281, 396/287, 429; 348/333.01, 333.02
  See application file for complete search history.

(56) References Cited

U.S. PATENT DOCUMENTS

| 6,154,210 | A | * | 11/2000 | Anderson | ........... | 715/840 |
| 7,215,793 | B2 | * | 5/2007 | Takahashi | ........... | 382/100 |
| 2003/0081950 | A1 | | 5/2003 | Gennetten et al. | | |
| 2004/0008210 | A1 | | 1/2004 | Ikehata et al. | | |

FOREIGN PATENT DOCUMENTS

| JP | 9-81094 | 3/1997 |
| JP | 2000-134681 | 5/2000 |

OTHER PUBLICATIONS

Chinese Office Action to Chinese Patent Application No. 2005101356264, mailed Sep. 28, 2007 (8 pgs.), with translation (8 pgs.).

* cited by examiner

*Primary Examiner*—Rodney E Fuller  
(74) *Attorney, Agent, or Firm*—Straub & Pokotylo; John C. Pokotylo

(57) ABSTRACT

A display control device having a pointing device adapted to perform an operation associated with image capture or playback includes, mode setting switches and/or components for setting at least one of operation modes of recording, playback and communication, components for obtaining identification information to identify the user of the display control device, an operating member display for displaying operating members in positions corresponding to the pointing device, storage for storing data concerning a plurality of operating members having different functions and placement positions, an operating member setting component for extracting data concerning operating members on the basis of the identification information obtained and setting the data to display the operating members, and an operation input controller for associating the functions of the operating members displayed on the operating member display with the input position and input operation of the pointing device.

11 Claims, 19 Drawing Sheets

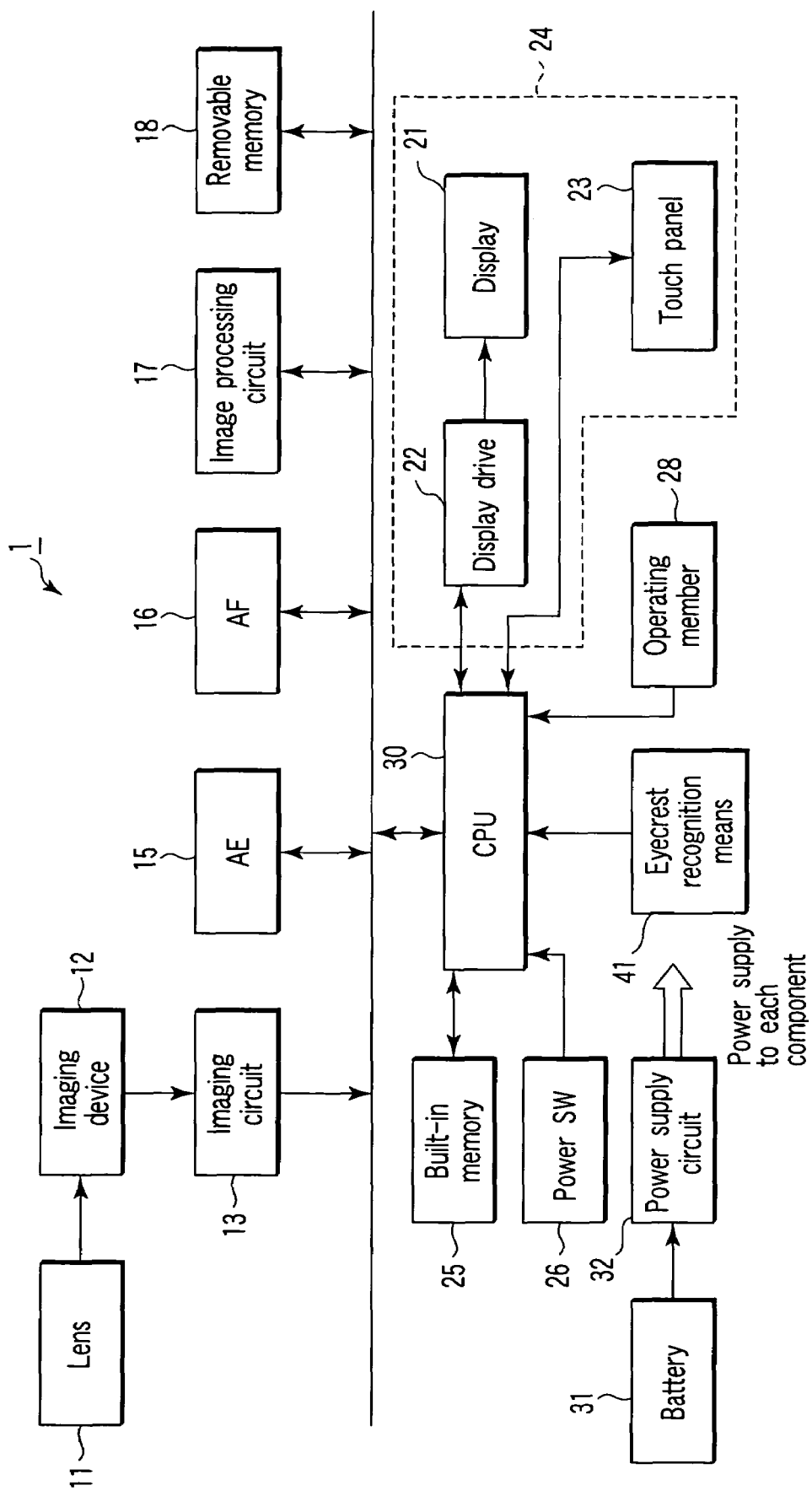
F I G. 16

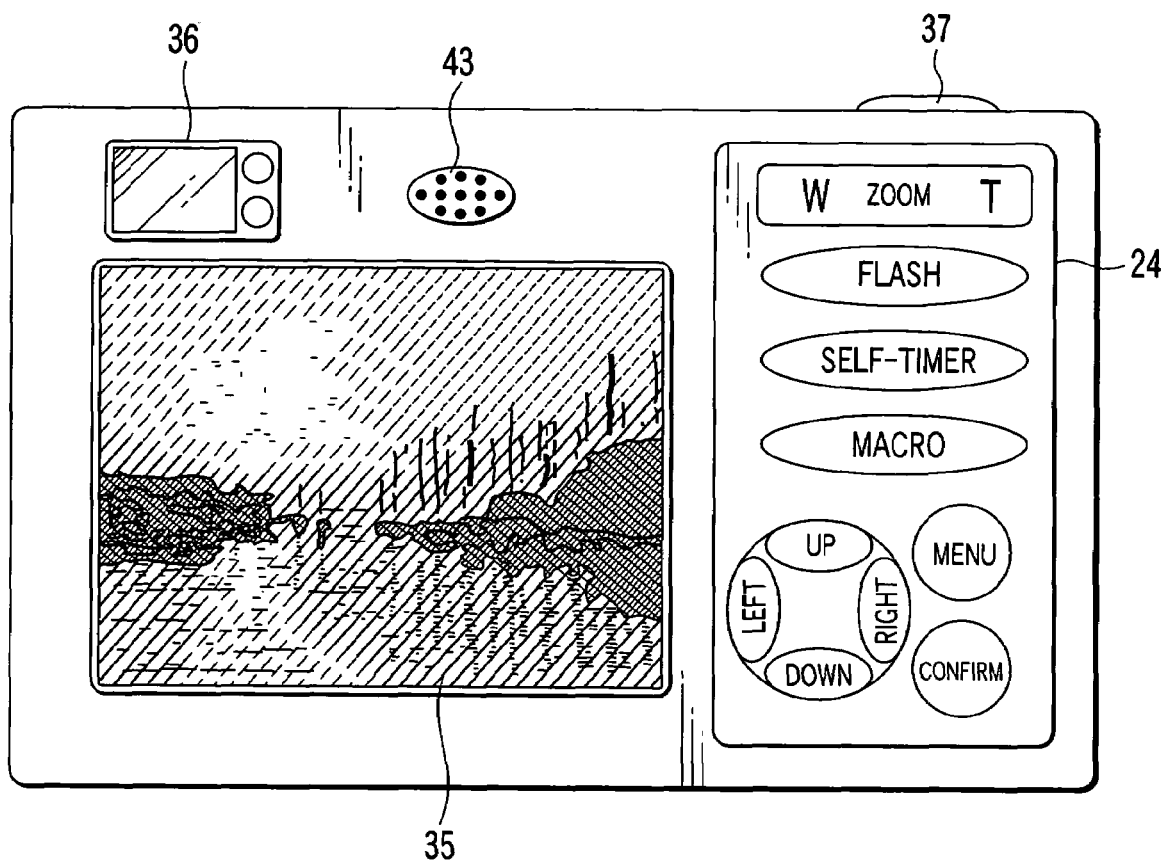
F I G. 20

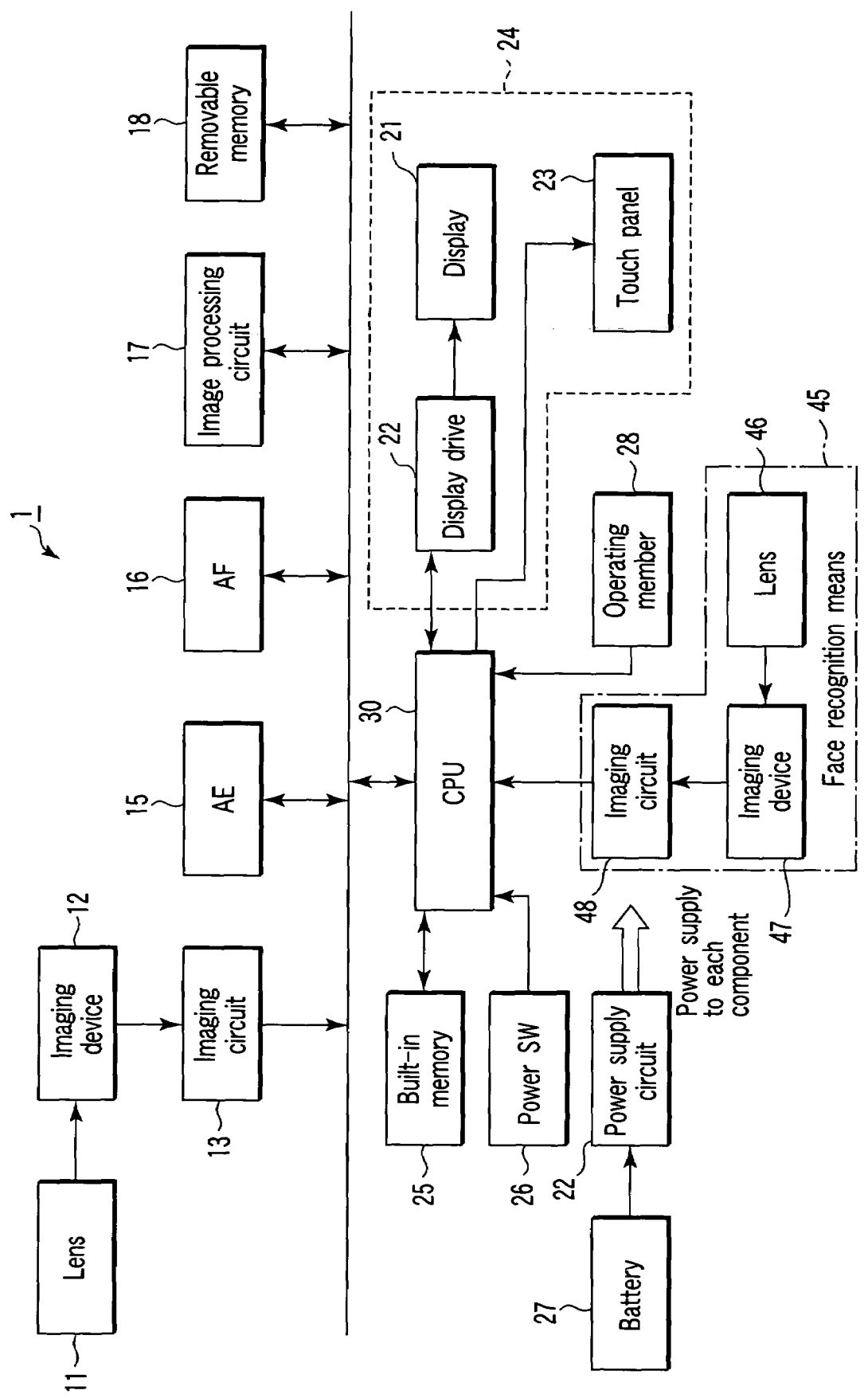
F I G. 22

DISPLAY CONTROL DEVICE AND METHOD

CROSS-REFERENCE TO RELATED APPLICATIONS

This application is based upon and claims the benefit of priority from prior Japanese Patent Application No. 2004-377127, filed Dec. 27, 2004, the entire contents of which are incorporated herein by reference.

BACKGROUND OF THE INVENTION

1. Field of the Invention

The present invention relates to a display control device and method which permits different users to have an operating system suitable for each individual user and perform operations associated with image capture or playback with ease.

2. Description of the Related Art

Digital cameras have various functions built in through the use of digital technology. While it has become possible to implement various functions, an operating panel used in utilizing built-in functions has to be equipped with many operating buttons to suit the functions.

A technique has been proposed which uses a touch-sensitive operating panel with a remote control device for operating two or more pieces of electrical equipment and changes its display screen according to electrical equipment to be operated (Japanese Unexamined Patent Publication No. 2000-134681).

Also, a technique has been proposed which permits the sizes, positions, colors and number of directive images to be displayed on the touch panel to be changed and changes the size of the key entry section on the touch panel according to the sizes of the directive images (Japanese Unexamined Patent Publication No. 9-81094).

BRIEF SUMMARY OF THE INVENTION

According to a first aspect of the present invention, there is provided a display control device having a pointing device adapted to perform an operation associated with image capture or playback comprising: mode setting means for setting at least one of operation modes of recording, playback and communication; identification information obtaining means for obtaining identification information to identify the user of the display control device; operating member display means for displaying operating members corresponding to the pointing device in positions corresponding to the pointing device; storage means for storing data concerning a plurality of operating members different in functions and placement position; operating member setting means for extracting data concerning operating members on the basis of the identification information obtained by the identification information obtaining means and setting the data to display the operating members on the operating member display means; and operation input control means for associating the functions of the operating members displayed on the operating member display means with the input position and input operation of the pointing device.

According to a second embodiment of the present invention, there is provided a display control device having a pointing device adapted to perform an operation associated with image capture or playback comprising: a mode setting unit which sets at least one of operation modes of recording, playback and communication; an identification information obtaining unit which obtains identification information to identify the user of the display control device; an operating member display unit which displays operating members corresponding to the pointing device in positions corresponding to the pointing device; a storage unit which stores data concerning a plurality of operating members different in functions and placement position; an operating member setting unit which extracts data concerning operating members on the basis of the identification information obtained by the identification information obtaining means and sets the data to display the operating members on the operating member display means; and an operation input control unit which associates the functions of the operating members displayed on the operating member display means with the input position and input operation of the pointing device.

According to a third aspect of the present invention, there is provided a display control method for use with a display control device having a pointing device adapted to perform an operation associated with image capture or playback comprising the steps of: setting at least one of operation modes of recording, playback and communication; obtaining identification information to identify the user of the display control device; displaying operating members corresponding to the pointing device in positions corresponding to the pointing device; storing data concerning a plurality of operating members different in functions and placement position; extracting data concerning operating members on the basis of the identification information obtained by the identification information obtaining means and setting the data to display the operating members on the operating member display means; and associating the functions of the operating members displayed on the operating member display means with the input position and input operation of the pointing device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 is a block diagram of a digital camera equipped with a display control device according to a third embodiment of the present invention;

FIGS. 18, 19 and 20 are rear views of the digital camera;

FIG. 22 is a block diagram of a digital camera equipped with a display control device according to a fifth embodiment of the present invention.

DETAILED DESCRIPTION OF THE INVENTION

First, a description is given of a touch panel used with a display control device of the present invention.

Figure 1:
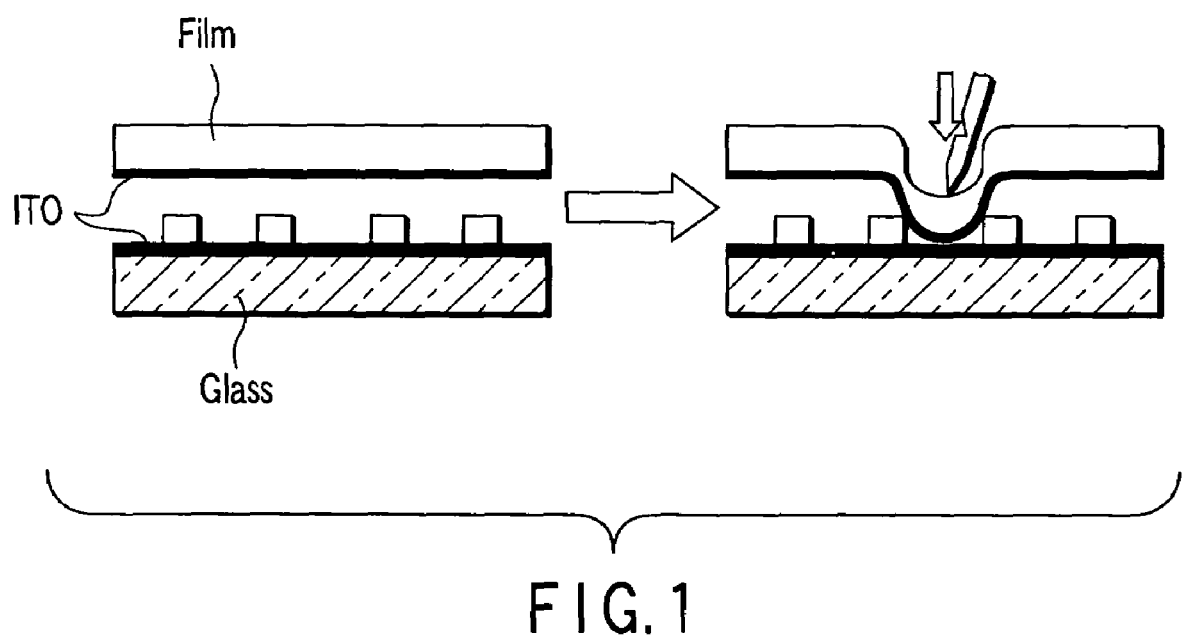
FIG. 1 is a diagram for use in explanation of the principle of a resistive-film-based touch-sensitive panel.

FIG. 1 is a diagram for use in explanation of the principle of a resistive-film-based touch-sensitive panel. The touch panel includes a sheet of glass and a transparent film which covers the glass sheet. Each of the glass sheet and the film is formed with ITO (indium tin oxide), which is a transparent conductive material, on its side which faces the glass sheet or film to form an electrode grid.

The glass sheet and the film are normally separated from each other. When the film is depressed with a finger, a pen, etc., the ITO conductive films on the glass sheet and the film are brought into contact with each other, forming a conductive circuit. Thus, the position of contact (depressed point) in a plane can be detected by measuring a divided voltage due to the resistance of the electrode grids on the glass sheet and the film.

This touch panel is provided on a display unit (for example, a TFT liquid crystal panel) on which a plurality of operating regions is arranged and displayed. By detecting the position of depression with the aforementioned method, the region operated by the user can be identified. That is, a pointing device, such as a touch panel, and a display unit can be combined for use as an operation input device having predetermined operation functions.

The touch panel used in the invention is not limited to the resistive-film type described here. As an alternative to the resistive film type, use may be made of an ultrasonic surface acoustic wave type, infrared blocking type, static capacitance type, or electromagnetic induction type. As an alternative to the TFT liquid crystal panel, use may be made of a nonvolatile liquid crystal display device in which a displayed image will not disappear even when the power is switched off.

The display control devices of the respective embodiments of the present invention will be described hereinafter taking a digital camera as an example.

FIRST EMBODIMENT

Figure 2:
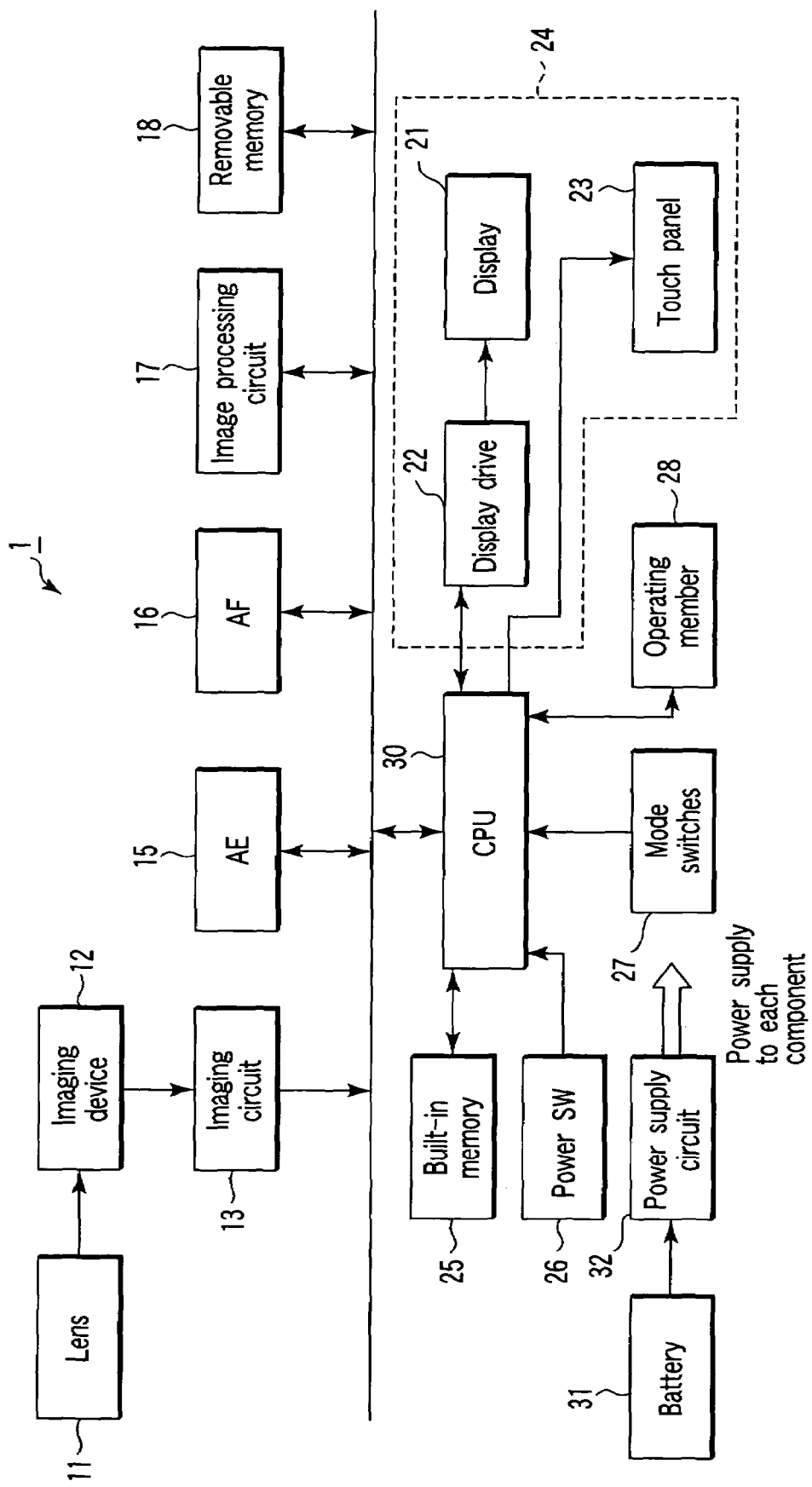
FIG. 2 is a block diagram of a digital camera equipped with a display control device according to a first embodiment of the present invention.

FIG. 2 is a block diagram of a digital camera equipped with a display control device according to a first embodiment of the present invention.

The digital camera, indicated at 1, includes a taking lens system 11, an imaging device 12, an imaging circuit 13, an AE (automatic exposure) circuit 15, an AF (autofocusing) circuit 16, an image processing circuit 17, a removable memory 18, a display unit 21, a display drive circuit 22, a touch panel 23, a built-in memory 25, a power switch (SW) 26, mode switches 27, an operating member 28, a CPU 30, a battery 31, and a power supply circuit 32.

The taking lens system 11 includes a zoom lens system, an aperture unit, and an autofocusing lens system. The imaging device 12 has a light sensor composed of, say, several megapixels and converts a subject image directed onto the light sensor through the taking lens system into an electrical signal. The imaging circuit 13 performs signal processing, such as AGC (automatic gain control), CDS (correlated double sampling), etc., on the electrical signal from the imaging device to form image data. The AE circuit 15 carries out automatic exposure operations on the basis of the image data. The AF circuit 16 performs autofocusing operations on the basis of the image data.

The image processing circuit 17 performs Y (brightness)/C (color) formation processing, color matrix processing for RGB signals having a proper color balance, etc. The removable memory 18 is a recording medium to store the image data.

The display unit 21 displays two or more operating regions arranged for touch panel. The display drive circuit 22 controls the operation of the display unit 21. The touch panel 23 detects the position of operation by the user on a plane. The input unit 24 is composed of the display unit 21, the display control circuit 22, and the touch panel 23 and serves as operation input means.

The built-in memory 25 stores various pieces of data. The power switch 26 turns on or off the power to the digital camera. The mode switches 27 are adapted to enter modes to identify the user and operation modes of the digital camera. The modes to identify the user comprise an inexperienced user (beginner) mode and an advanced user mode. The operation modes of the digital camera include a communication mode, a playback mode, and an image capture mode. The operating member 28 is adapted to exclusively perform a predetermined function like a release button.

The CPU 30 exercises control over the digital camera 1. The battery 31 and the power supply circuit 32 applies the power to each component of the digital camera 1.

The operation of the display control device of the first embodiment will be described next.

Figure 3:
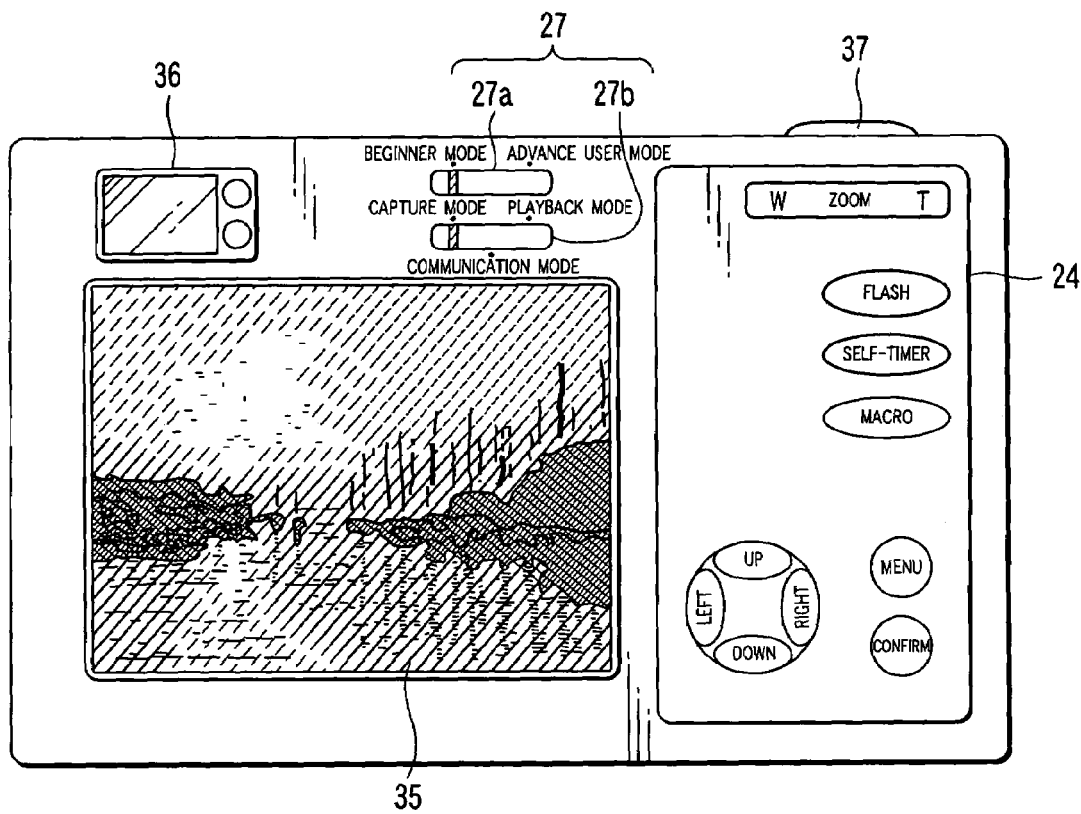
FIGS. 3 through 8 are rear views of the digital camera.

FIG. 3 is a rear view of the digital camera. The digital camera 1 is equipped on its back and top with the input unit 24, the mode switches 27, a liquid crystal (LC) monitor 35, a viewfinder 36, and a release button 37. The mode switches 27 comprise a user mode switch 27a and an operation mode switch 27b.

In FIG. 3, the user mode switch 27a has been set to the beginner mode and the operation mode switch 27b has been set to the image capture mode. The beginner mode is used in capturing images using basic functions but not special functions. Selecting the beginner mode causes the input unit 24 to display operating members: "ZOOM", "FLASH", "SELF-TIMER", "MACRO", "JOG DIAL", "MENU", and "CONFIRM". Setting the operation mode switch 27b to the image capture mode causes a through-image of a subject to be displayed on the LC monitor 35.

Figure 4:
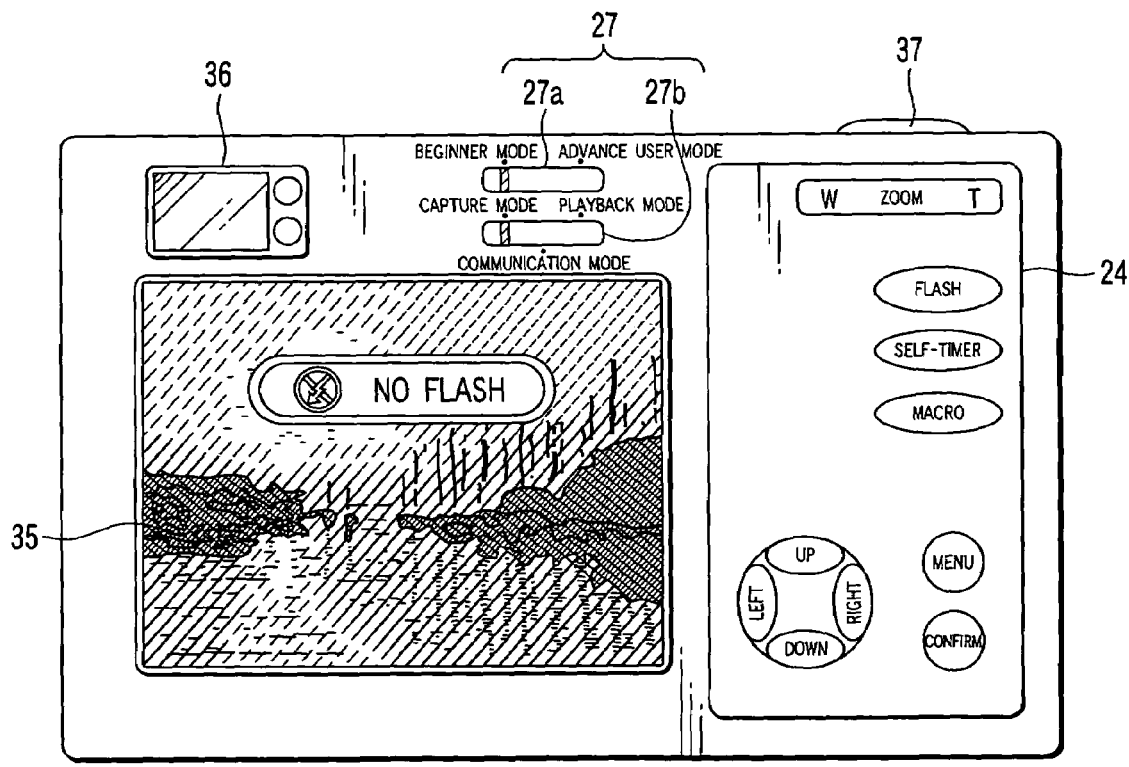

Each time the user depresses "FLASH" on the input unit 24, the use of flash is allowed or disallowed. On the LC monitor 35 shown in FIG. 4, a message of no flash is displayed.

Figure 5:
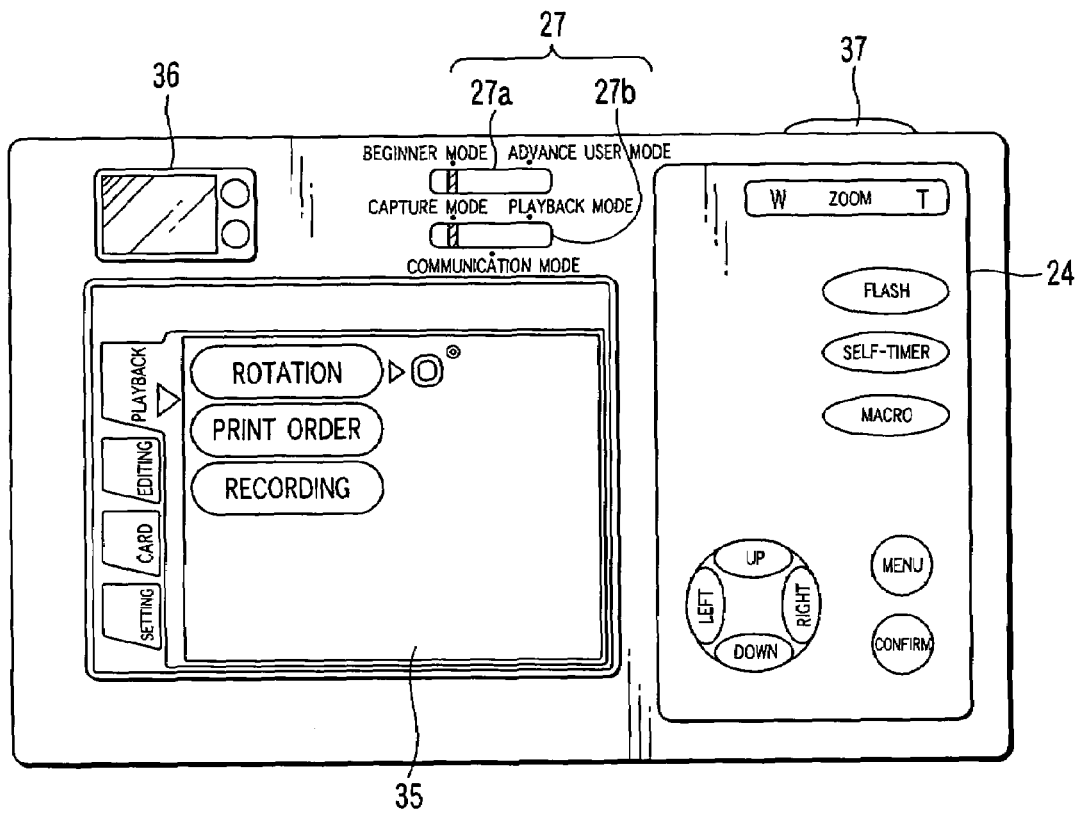

When the user depresses "MENU" on the input unit 24, a menu is displayed on the monitor 35 as shown in FIG. 5. By operating "JOG DIAL" and "CONFIRM" on the input unit 24, the user can select "PLAYBACK", "EDITING", "MEMORY CARD", or "SETTING" to carry out desired processing.

Figure 6:
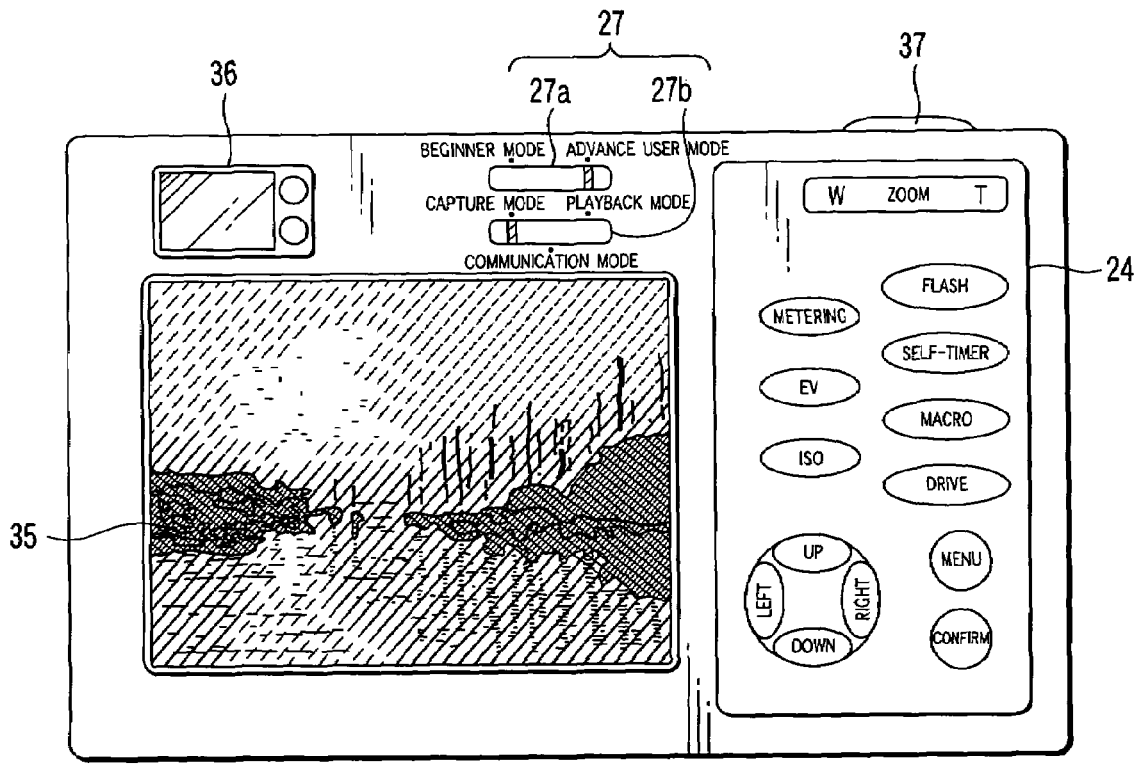

FIG. 6 shows a state in which the user mode switch 27a has been set to the advanced user mode. In this state, in addition to the operating members associated with the basic functions, other operating members are displayed: "DRIVE", "METERING", "EXPOSURE COMPENSATION (EV)", and "ISO". Thereby, the user is allowed to carry out shooting under special conditions, shooting in continuous shooting mode, shooting with exposure and sensitivity set, etc.

Figure 7:
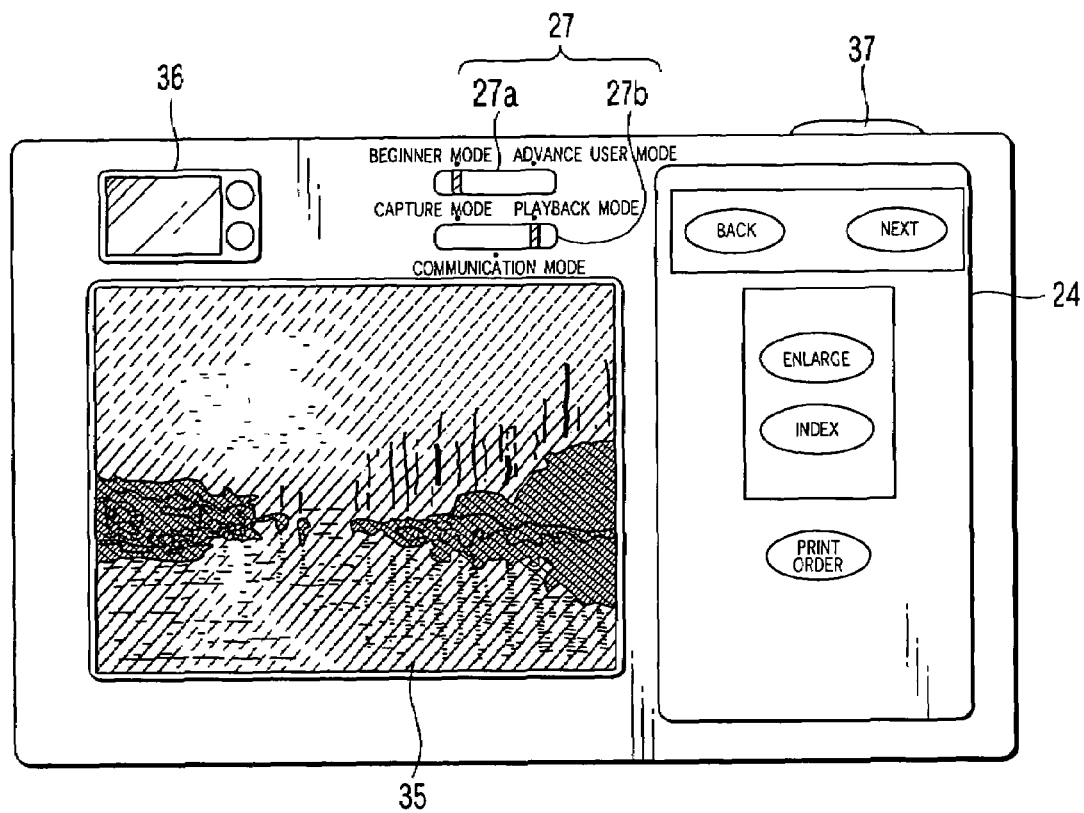

FIG. 7 shows a state in which the operation mode switch 27b has been set to the playback mode. In this state, an image captured and stored in the removable memory 18 is displayed on the LC monitor 35. On the input unit 24 are displayed new operating members: "FRAME ADVANCE (NEXT)", "FRAME BACK (BACK)", "ENLARGED PLAYBACK", "INDEX DISPLAY", and "PRINT ORDER". Thereby, the user is allowed to display captured images and instruct an external device (not shown) to print selected images if need arises.

Figure 8:
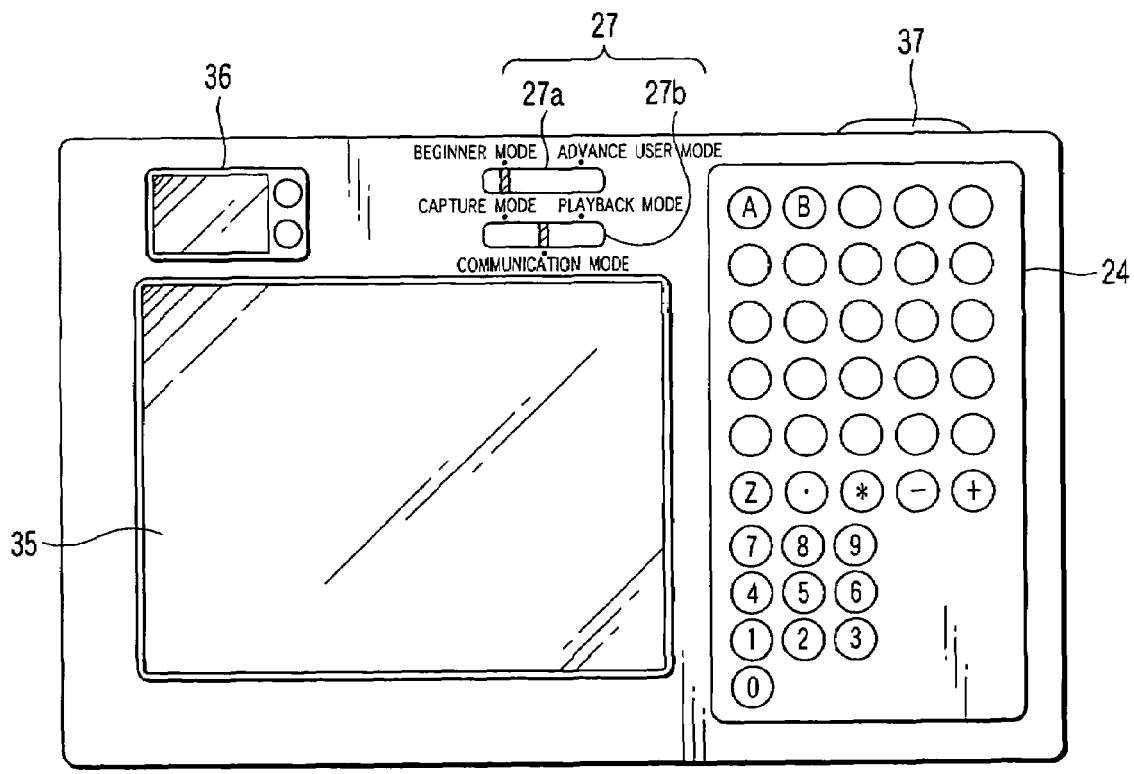

FIG. 8 shows a state in which the operation mode switch 27b has been set to the communication mode. In this state, alphabetic and numeric keys are displayed on the input unit 24. By operating these keys, the user is allowed to communicate information (e.g., mail) with an external device (not shown). The kinds and placement positions of the operating members have been stored in the built-in memory 25 as default values or preset data.

The LC monitor 35 need not be fixed on the back of the digital camera 1. It may be structured so that it can be drawn out and rotated or tilted. In addition, the LC monitor 35 and the input unit 24 need not be separate from each other but may be integrated with each other. Furthermore, the mode switches 27 may be contained in the input unit 24.

Subsequently, a procedure of implementing the functions of the aforementioned display control device will be described with reference to FIG. 9, which is a flowchart for mode switching in the display control device.

Figure 9:
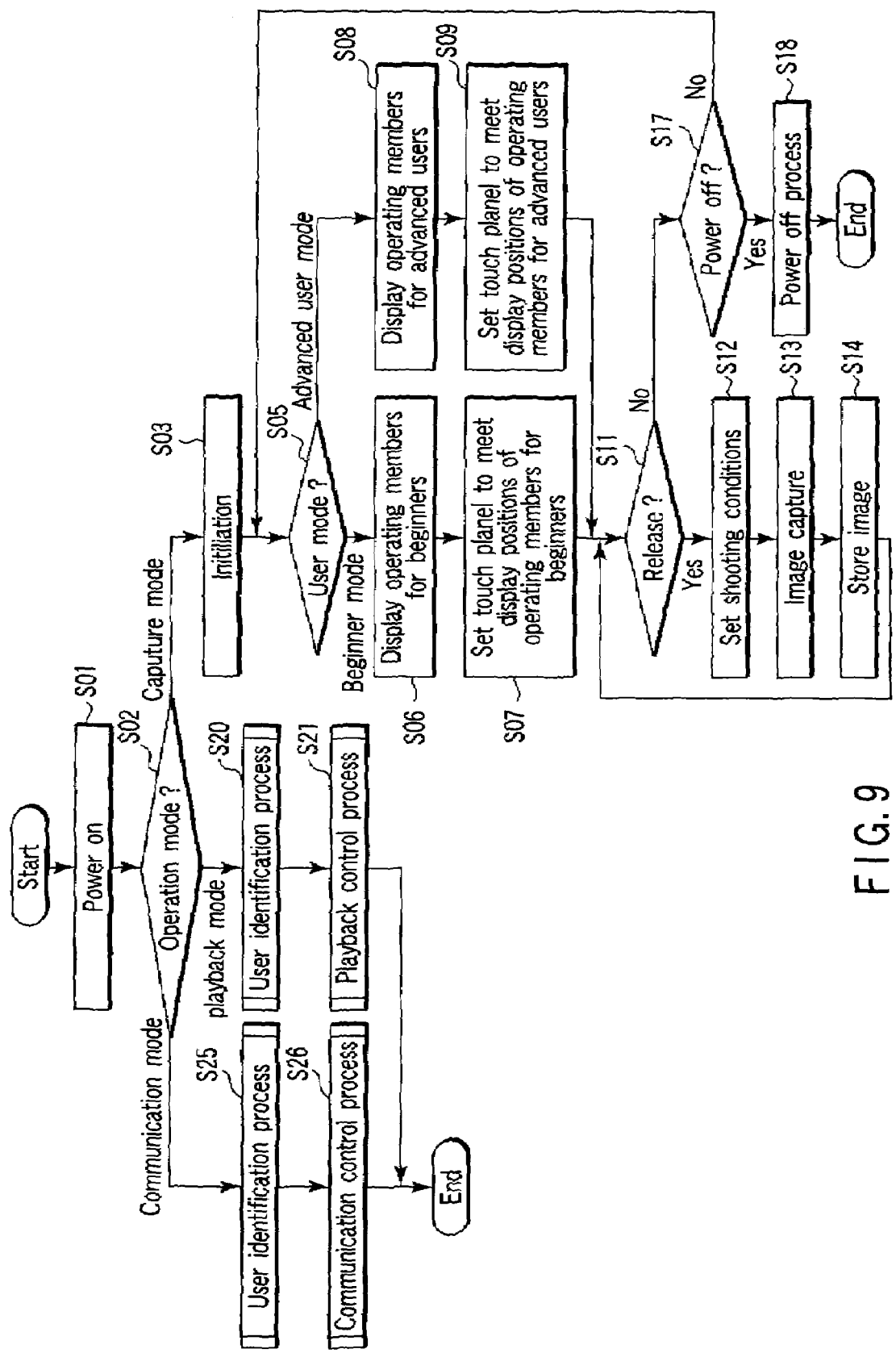
FIG. 9 is a flowchart for mode switching in the display control device.

In steps S01 and S02 of FIG. 9, when the power is applied to the digital camera 1, the CPU 30 examines the state of the mode switches 27. When the operation mode switch 27b has been set to the image capture mode, initialization is carried out in step S03. For example, table values are set to default values or previous settings are restored.

If, in step S05, the user mode switch 27a has been set to the beginner mode, the operating members for inexperienced users are displayed on the display unit 27 in step S06 and the touch panel 23 is set to meet the display positions of the operating members for beginners in step 07. If, on the other hand, the user mode switch 27a has been set to the advanced user mode in step S05, the operating members for advanced users are displayed on the display unit 27 in step S08 and the touch panel 23 is set to meet the display positions of the operating members for advanced users in step S09.

When a release operation is performed in step S11, shooting conditions are set in the taking lens system 11 in step S12 on the basis of the results of operations by the AE circuit 15 and the AF circuit 16, then an image is captured in step S13 and the captured image is stored into the built-in memory 25 or the removable memory 18 in step S14. If the power switch 26 is turned off in step S17, a power-off process is carried out in step S18. If the power switch 26 is not turned off, the digital camera enters the wait state to monitor whether a new mode switch operation or release operation is performed.

If, in step S02, the operation mode switch 27b has been set to the playback mode, then a user identification process is carried out in step S20. This user identification process is the same as the process in steps S05 through S09; thus, its detailed description is omitted. When an operating member associated with playback is operated, a corresponding playback control operation is carried out in step S21. The digital camera then is placed in the wait state for a fresh mode switch or playback operation.

If, in step S02, the operation mode switch 27b has been set to the communication mode, then a user identification process is carried out in step S25. This user identification process is the same as the process in steps S05 through S09; thus, its detailed description is omitted. When an operating member associated with communication is operated, a corresponding communication control operation is carried out in step S26. The digital camera is then placed in the wait state for a fresh mode switch or communication operation.

SECOND EMBODIMENT

Figure 10:
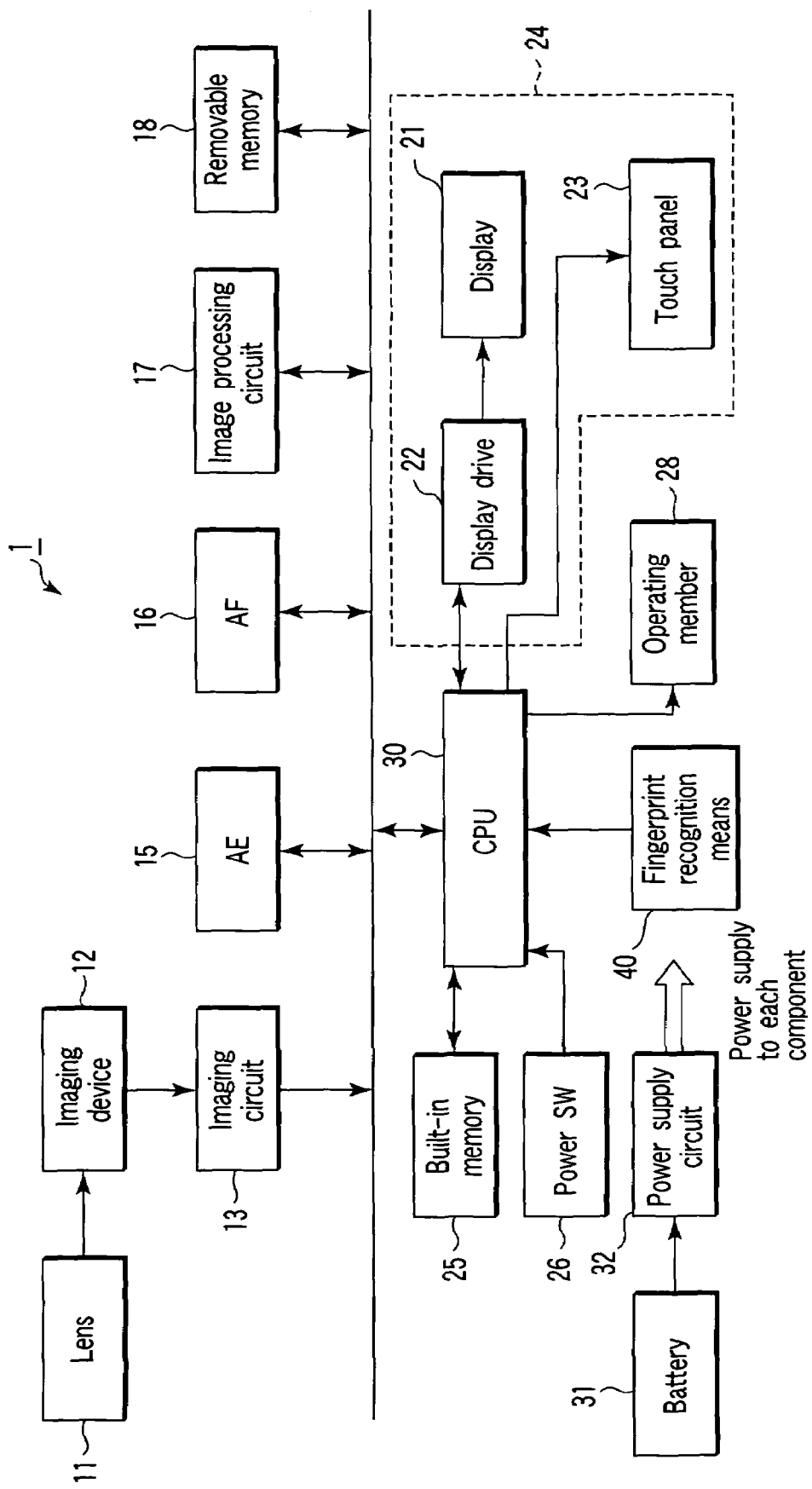
FIG. 10 is a block diagram of a digital camera equipped with a display control device according to a second embodiment of the present invention.

FIG. 10 is a block diagram of a digital camera equipped with a display control device according to a second embodiment of the present invention. The second embodiment is different from the first embodiment in that the mode switches 27 are replaced with fingerprint recognition means 40 to identify the user by his or her fingerprint. Thus, corresponding components to those in the first embodiment are denoted by like reference numerals and detailed descriptions thereof are omitted.

Figure 11:
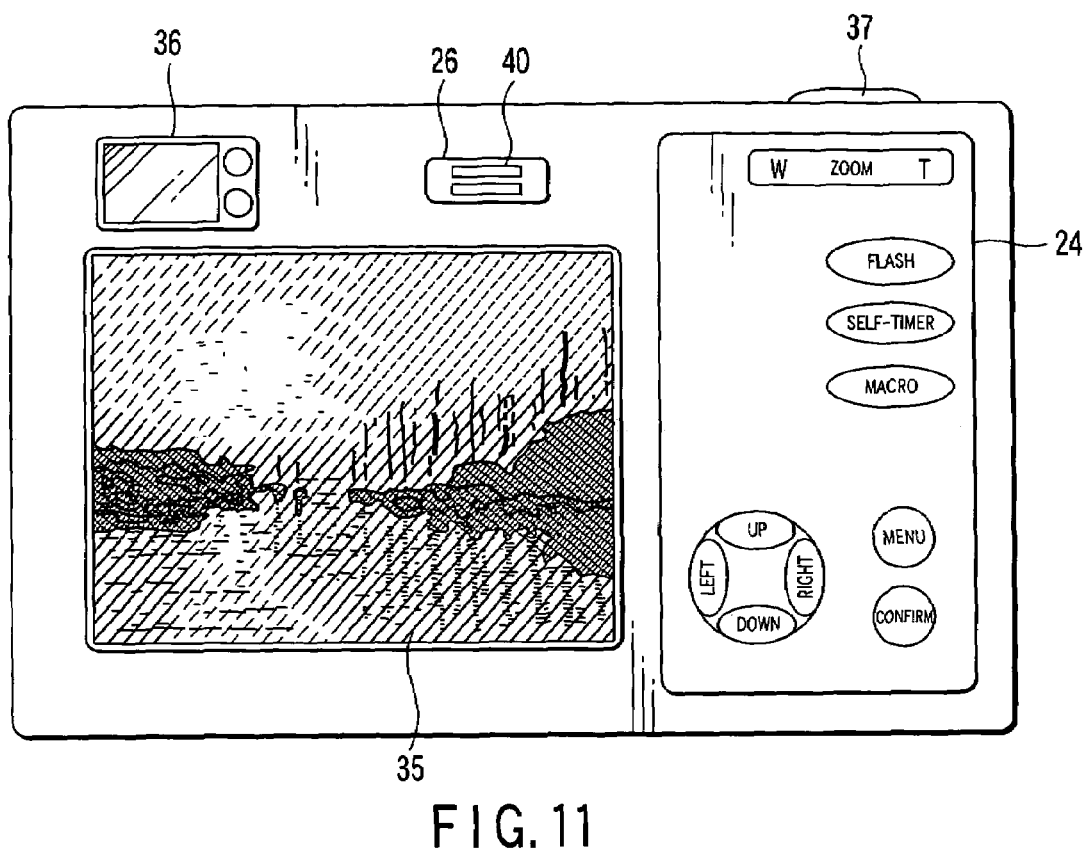
FIGS. 11 and 12 are rear views of the digital camera.

FIG. 11 is a rear view of the digital camera equipped with a display control device according to the second embodiment. In the second embodiment, the fingerprint recognition means 40 is made integral with the power switch 26. Therefore, when the user operates the power switch 26, his or her fingerprint can be recognized, thus eliminating the need for the user to perform a special operation for fingerprint recognition.

Figure 12:
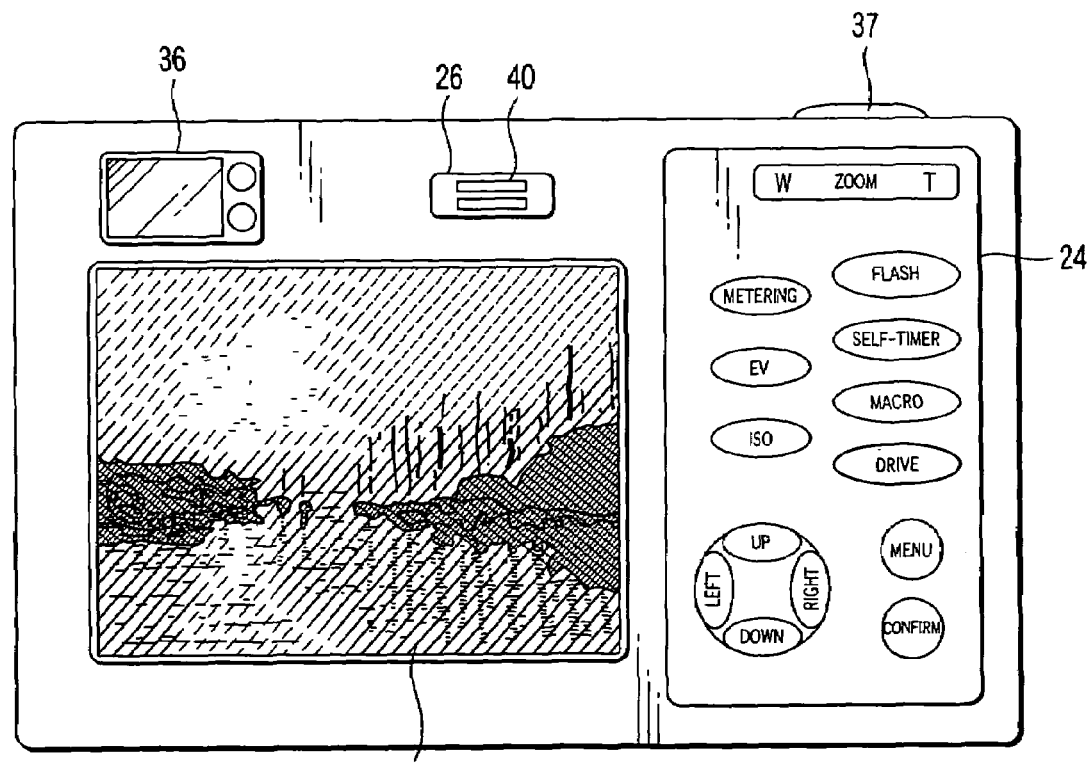

The fingerprint recognition means 40 identifies the user by his or her fingerprint and then displays operating members allocated to that user on the input unit 24. As a result, in FIG. 11, the operating members in the inexperienced user mode are displayed. In FIG. 12, on the other hand, the operating members in the advanced user mode are displayed.

Figure 13:
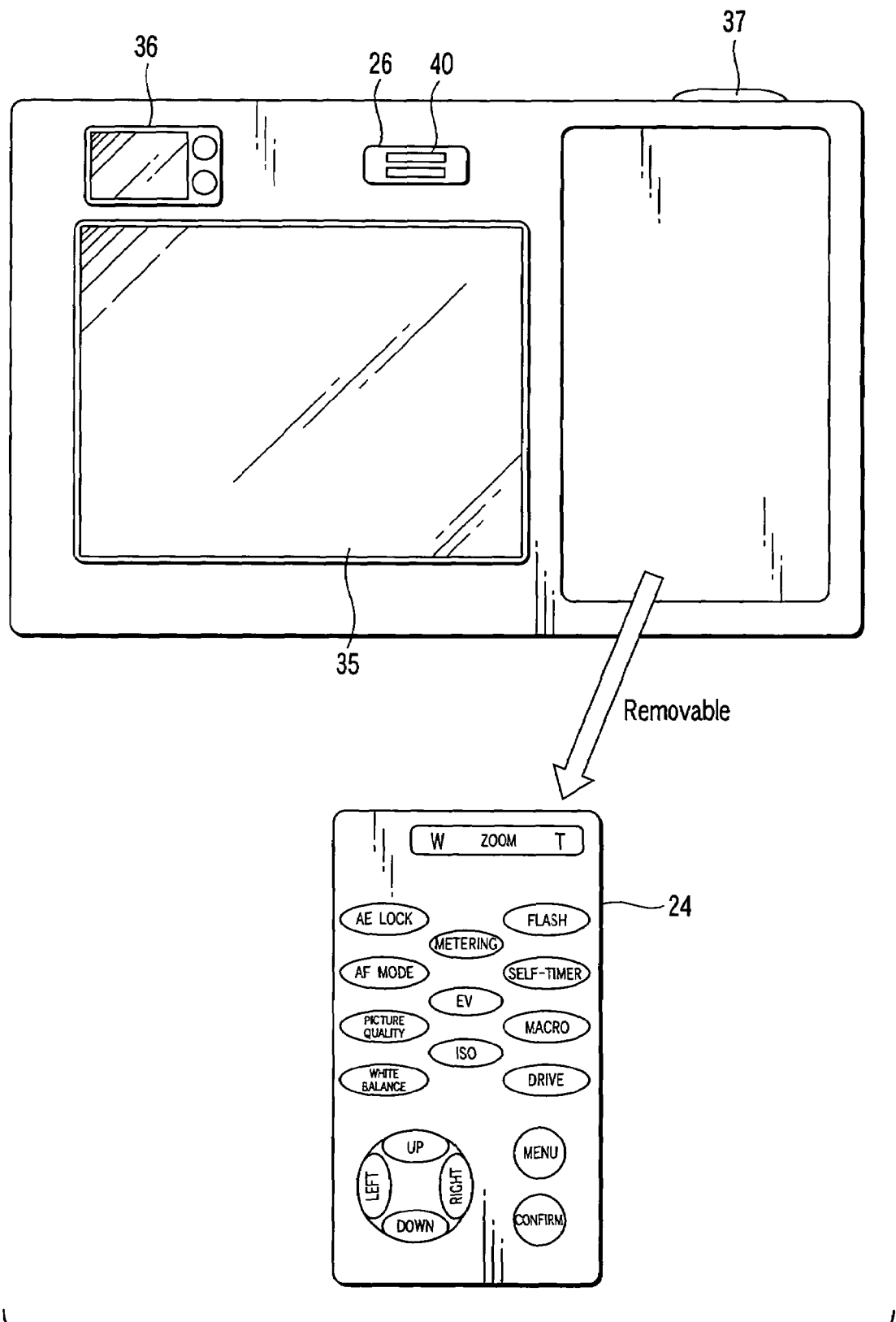
FIG. 13 shows the staggered arrangement of operating members.

By arranging the operating members displayed on the input unit 24 in such a staggered form as shown in FIG. 13, the number of operating members to be displayed can be increased and erroneous operations can be reduced. Further, constructing the input unit 24 so as to be removably attached to the digital camera 1 will make part exchange easy.

Figure 14:
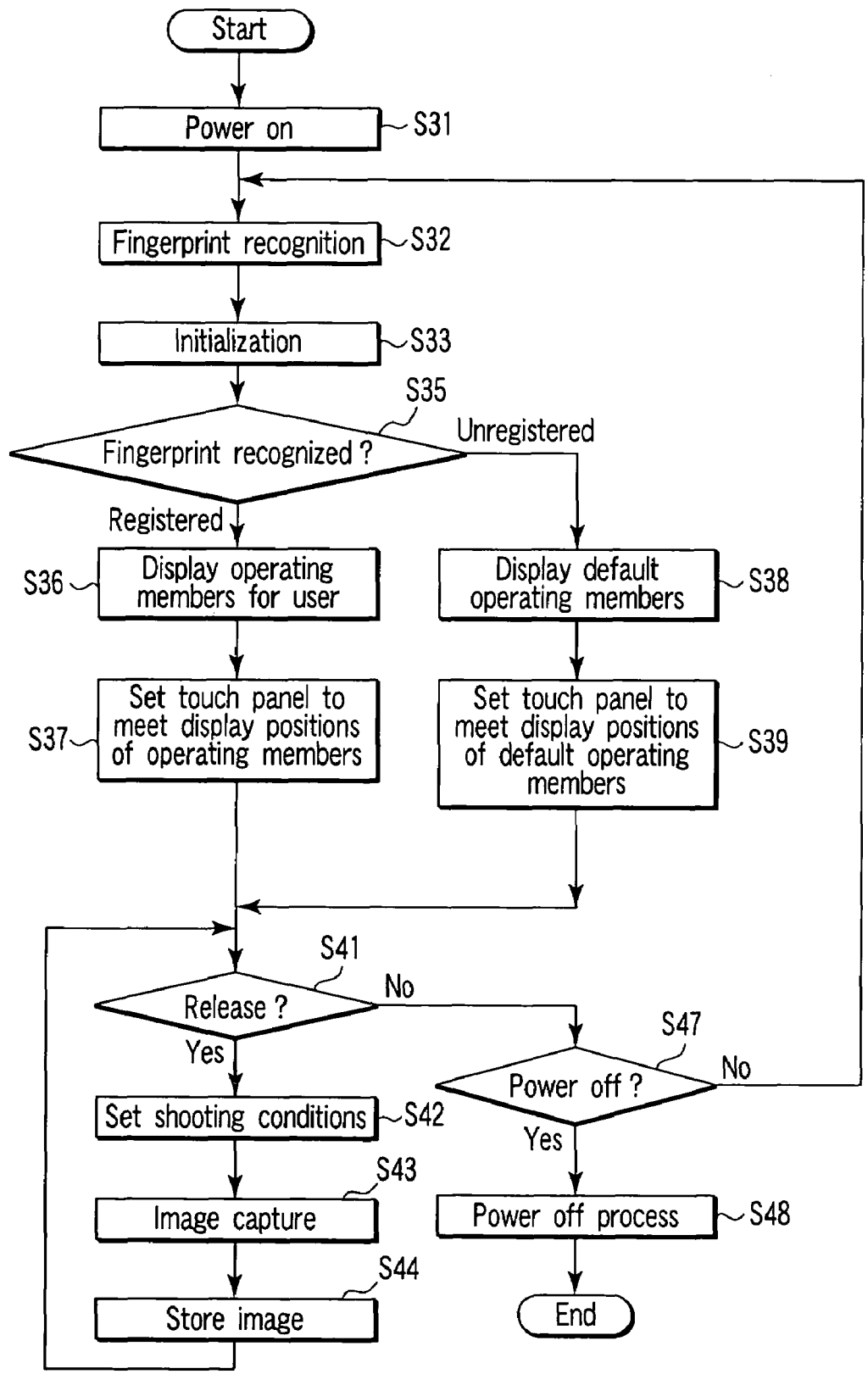
FIG. 14 is a flowchart for display switching based on fingerprint recognition.

A procedure of realizing the operations of the display control device of the second embodiment will be described next. FIG. 14 is a flowchart for display switching based on fingerprint recognition. The second embodiment has not capture, playback and communication modes corresponding to the operation modes described in the first embodiment; however, this does not necessarily means that no operation modes are used. The processing described below and the assignment processing based on the operation modes may be combined.

In steps S31, S32 and S33 in FIG. 14, when the power is applied to the digital camera, the fingerprint recognition means 40 obtains a fingerprint of the user and then initialization is carried out. For example, table values are set to default values or previous settings are restored.

In step S35, the fingerprint recognition means 40 checks whether or not the obtained fingerprint has been registered. The fingerprint registration process will be described later. If the fingerprint has been registered, operating members corresponding to the user having the registered fingerprint are displayed on the display unit 21 in steps S36 and S37. The touch panel 23 is set in position to meet the displayed positions of the operating members. If, on the other hand, the fingerprint is unregistered, the default operating members are displayed in steps S38 and S39. The touch panel 23 is then set in position to meet the displayed positions of the operating members.

When a release operation is performed in step S41, shooting conditions are set in the taking lens system 11 in step S42 on the basis of the results of operations by the AE circuit 15 and the AF circuit 16, then an image of a subject is captured in step S43 and the captured image is stored into the built-in memory 25 or the removable memory 18 in step S44. When the power switch 26 is turned off in step S47, a power-off process is carried out in step S48. If the power switch 26 is not turned off, the digital camera is placed in the wait state for fresh fingerprint detection or a fresh release operation.

Figure 15:
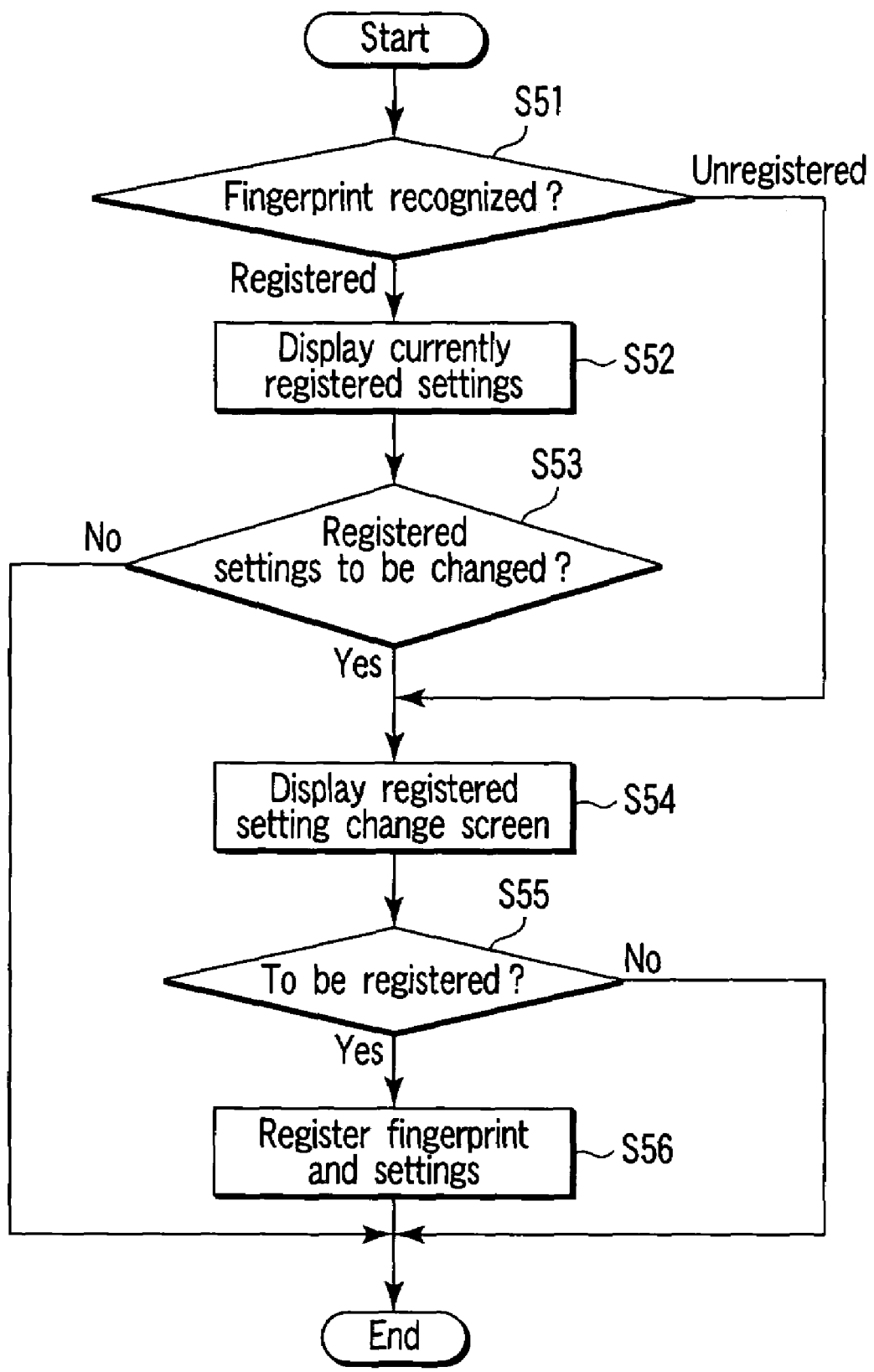
FIG. 15 is a flowchart illustrating a procedure of entering a fingerprint.

FIG. 15 is a flowchart for fingerprint registration. When the user selects fingerprint registration from a menu on the input unit 24, the fingerprint recognition means 40 obtains a fingerprint and then checks whether it has been registered or not in step S51.

If the fingerprint has been registered, then the currently registered settings corresponding to the fingerprint are displayed on the LC monitor 35 in step S52 and the user is then prompted to decide whether to change the registered contents or not in step S53.

When the user changes the registered contents or the fingerprint is unregistered, a registration setting change screen is displayed in step S54. The user is allowed to select operating members suitable for him or her on the setting screen. When the user performs an operation to register the settings in step S55, the obtained fingerprint and the settings are registered in step S56. The procedure then comes to an end.

THIRD EMBODIMENT

FIG. 16 is a block diagram of a digital camera equipped with a display control device according to a third embodiment of the present invention. The third embodiment is different from the first embodiment in that the mode switches 27 are replaced with eye crest recognition means 41 to identify the user by his or her eye crest. Thus, corresponding components to those in the first embodiment are denoted by like reference numerals and detailed descriptions thereof are omitted.

The eye crest recognition means 41 is constructed integrally with the viewfinder 36. When the user looks through the viewfinder 36 while gripping the digital camera 1, the eye crest recognition means 41 obtains an eye crest of the user and displays operating members set by the user having the registered eye crest on the display unit 21.

The back-side configuration of the digital camera 1 and the display switching procedure based on eye crest recognition other than provision of the eye crest recognition means are the same as the contents already described and hence detailed descriptions are omitted.

FOURTH EMBODIMENT

Figure 17:
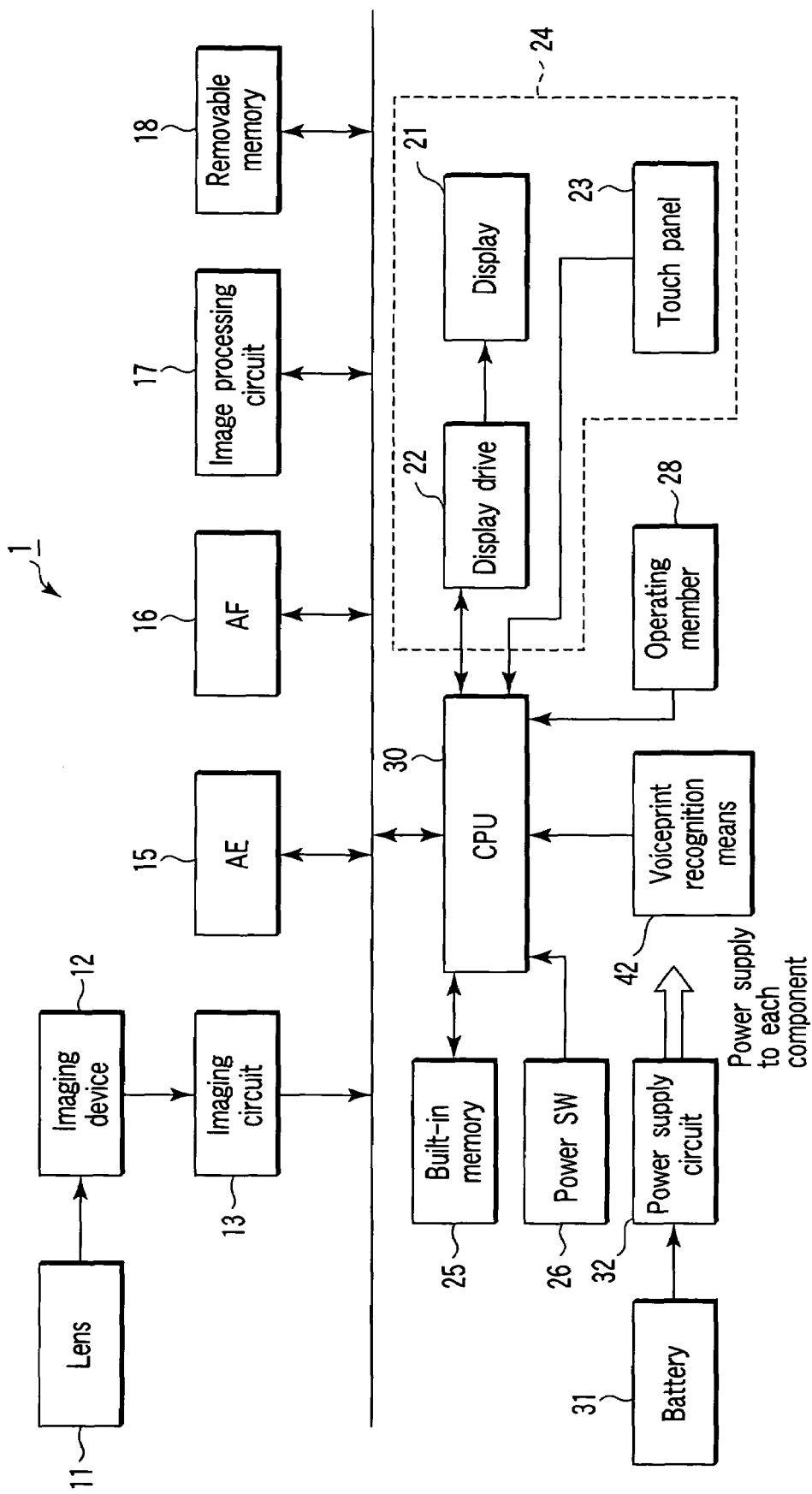
FIG. 17 is a block diagram of a digital camera equipped with a display control device according to a fourth embodiment of the present invention.

FIG. 17 is a block diagram of a digital camera equipped with a display control device according to a fourth embodiment of the present invention. The fourth embodiment is different from the first embodiment only in that the mode switches 27 are replaced with voice recognition means 40 to identify a group to which the user belongs by voiceprints. Thus, corresponding components to those in the first embodiment are denoted by like reference numerals and detailed descriptions thereof are omitted.

Figure 18:
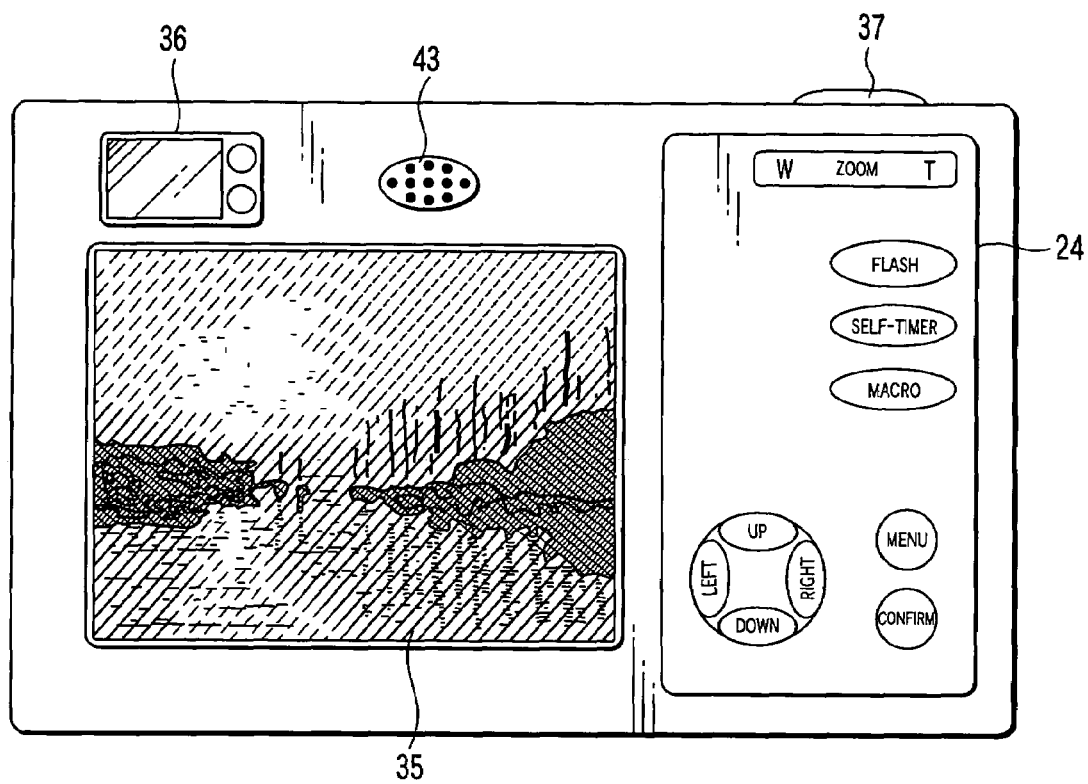

FIG. 18 is a rear view of the digital camera 1 having the display control device of the fourth embodiment. In the fourth embodiment, a microphone 43 is provided anew. When capturing an image, the user makes his or her predetermined voice toward the microphone 43. The voiceprint recognition means 42 identifies a group to which the user belongs on the basis of that voice and then displays operating members assigned to that group on the input unit 24. As a result, in FIG. 18, the operating members in the beginner mode are displayed.

Figure 19:
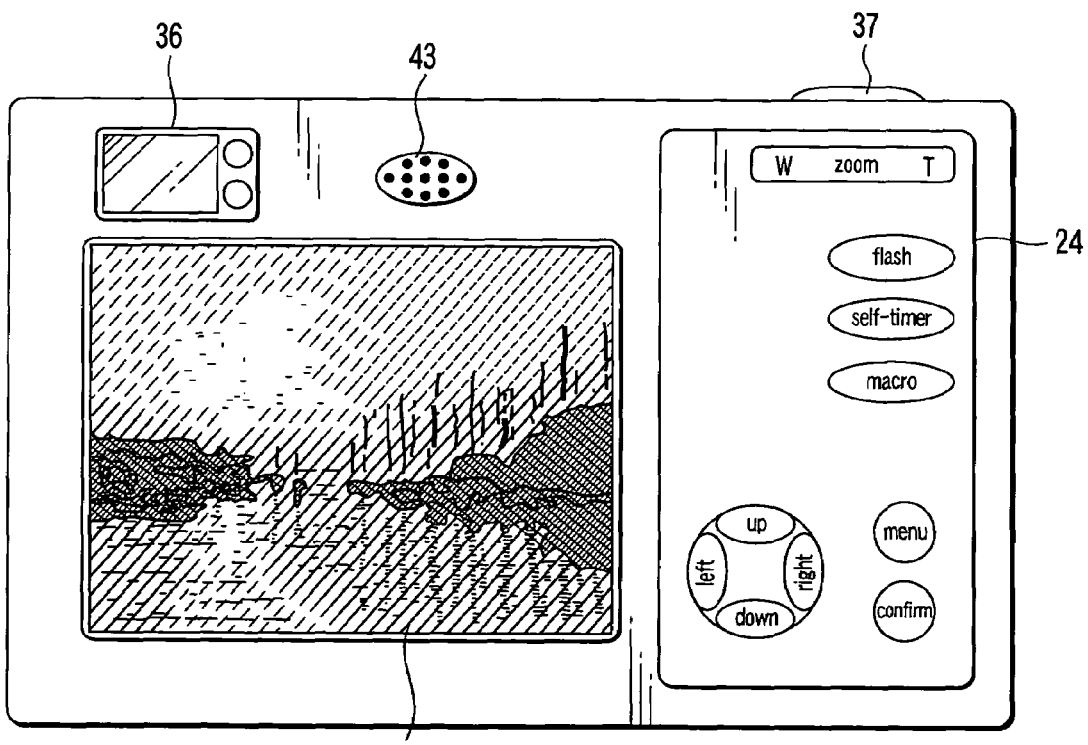

FIG. 19 shows a rear view of the digital camera 1 when used by a child. When the voiceprint recognition means 42 recognizes from voice that the user is a child, operating members assigned to children are displayed on the input unit 24. As a result, in FIG. 19, the operating members are displayed in a form easy for children to understand. For example, the operating members are displayed by simple words for little children. In the case of Japanese, the words may be displayed in hiragana. In the case of Chinese, Pinyin may be used. Additionally, the operating members may be displayed using pictures or colors.

FIG. 20 shows a rear view of the digital camera 1 when used by an old person. When the voiceprint recognition means 42 recognizes from voice that the user is an old person, operating members assigned to old persons are displayed on the input unit 24. As a result, in FIG. 20, the operating members are displayed using large characters.

Figure 21:
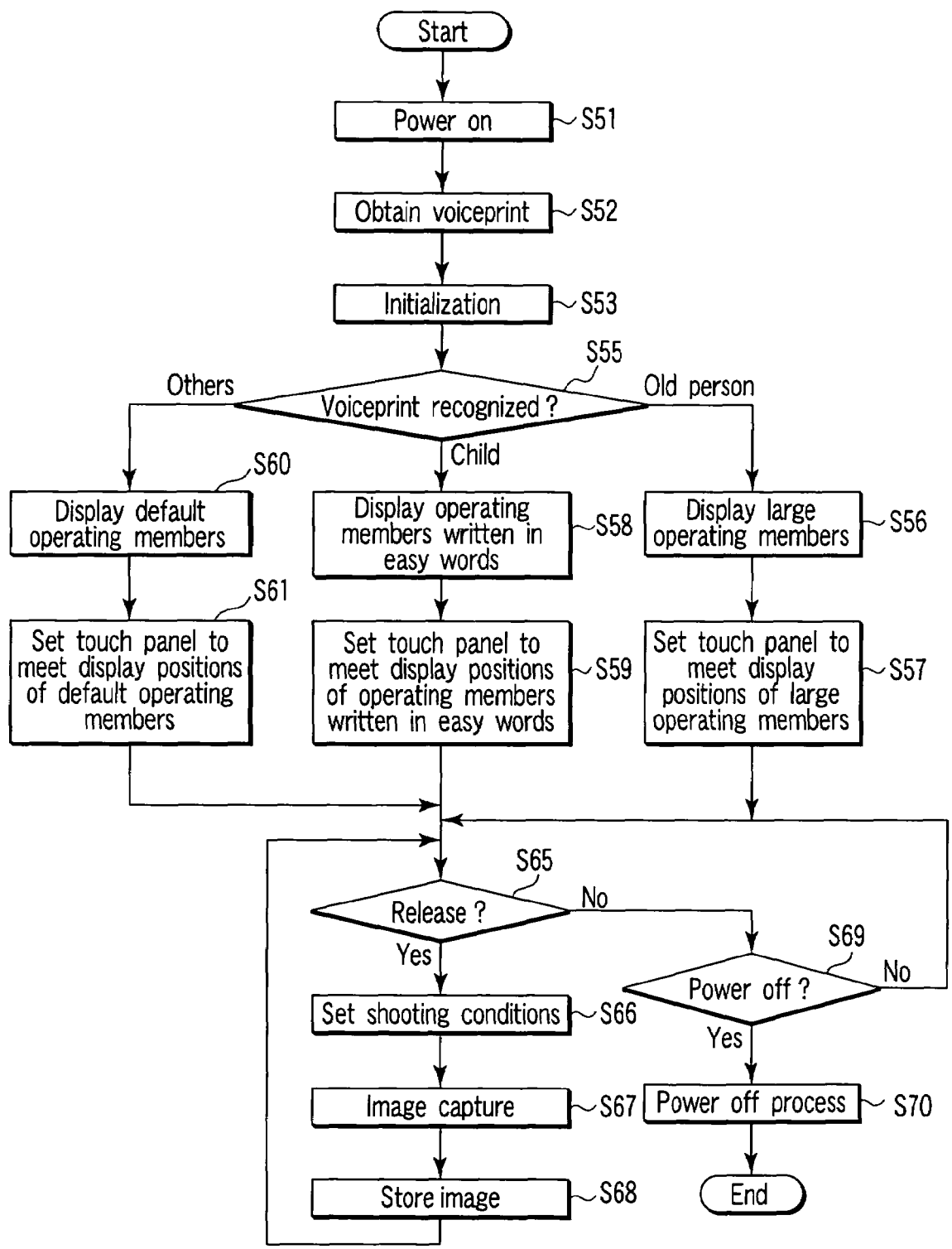
FIG. 21 is a flowchart for display switching based on voiceprint recognition.

A procedure of realizing the operations of the display control device of the fourth embodiment will be described next. FIG. 21 is a flowchart for display switching based on voiceprint recognition. The fourth embodiment has no capture, playback and communication modes corresponding to the operation modes described in the first embodiment; however, this does not necessarily mean that no operation modes are used. The processing described below and the assignment processing based on the operation modes may be combined.

In steps S51, S52 and S53 in FIG. 21, when the power is applied to the digital camera 1, the voiceprint recognition means 42 obtains a voiceprint of the user and then initialization is carried out. In the initialization step, for example, table values are set to default values or previous settings are restored.

In step S55, the voiceprint recognition means 42 checks the obtained voiceprint to decide which of groups of old persons, children and others the user belongs to.

When the user is an old person, operating members are displayed in enlarged form on the display unit 21 in step S56. The touch panel 23 is then set in position to meet the displayed positions of the operating members in step S57. If the user is a child, operating members written in words easy for children to understand are displayed in step S58. The touch panel 23 is then set in position to meet the displayed positions of the operating members in step S59. If, on the other hand, the user belongs to the group of others, then the default operating members are displayed in step S60. The touch panel 23 is then set in position to meet the displayed positions of the operating members in step S61.

When a release operation is performed in step S65, shooting conditions are set in the taking lens system 11 in step S66 on the basis of the results of operations by the AE circuit 15 and the AF circuit 16, then an image of a subject is captured in step S67 and the captured image is stored into the built-in memory 25 or the removable memory 18 in step S68. When the power switch 26 is turned off in step S69, a power-off process is carried out in step S70. If the power switch 26 is not turned off, then the digital camera is placed in the wait state for a fresh release operation.

FIFTH EMBODIMENT

FIG. 22 is a block diagram of a digital camera equipped with a display control device according to a fifth embodiment of the present invention. The fifth embodiment is different from the fourth embodiment only in that the voiceprint recognition means 42 is replaced with face recognition means 45 to identify a group to which the user belongs by a user's face image. Thus, corresponding components to those in the fourth embodiment are denoted by like reference numerals and detailed descriptions thereof are omitted.

The face recognition means 45 comprises a lens 46, an imaging device 48, and an imaging circuit 48. An optical image of the user is formed through the lens 46 onto the imaging device 47. The imaging device 47 converts the subject image incident on it into an electrical signal. The imaging circuit 48 performs signal processing, such as AGC, CDS, etc., on a signal read from the imaging device 47 to produce image data and then outputs it to the CPU 30.

Figure 23:
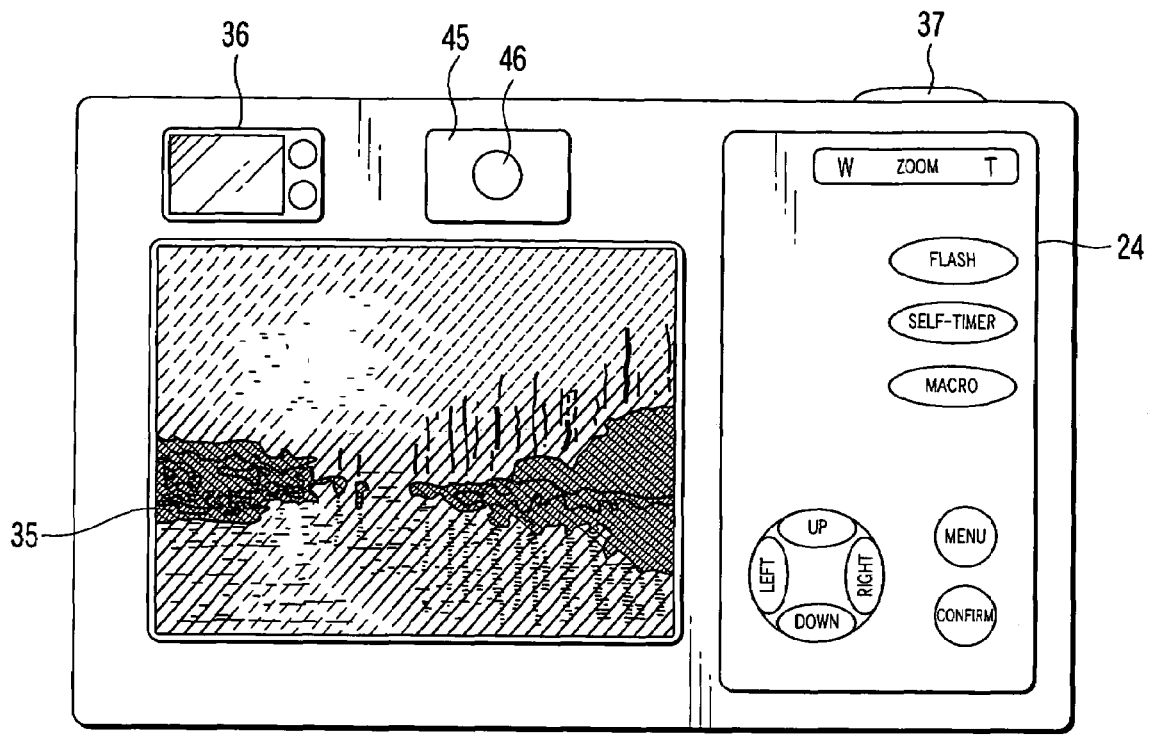
FIGS. 23, 24 and 25 are rear views of the digital camera.

FIG. 23 is a rear view of the digital camera 1 having the display control device of the fifth embodiment. In the fifth embodiment, the face recognition means 45 is provided anew. The face recognition means 45 captures the face image of the user at the time when he or she directs his or her face toward the lens 46 as when the user grips the camera or performs a menu operation. The face recognition means 45 produces a face image and then outputs it to the CPU 30, which identifies a group to which the user belongs on the basis of that face image and then displays operating members assigned to that group on the input unit 24. As an example, in FIG. 23, the operating members in the beginner mode are displayed.

Figure 24:
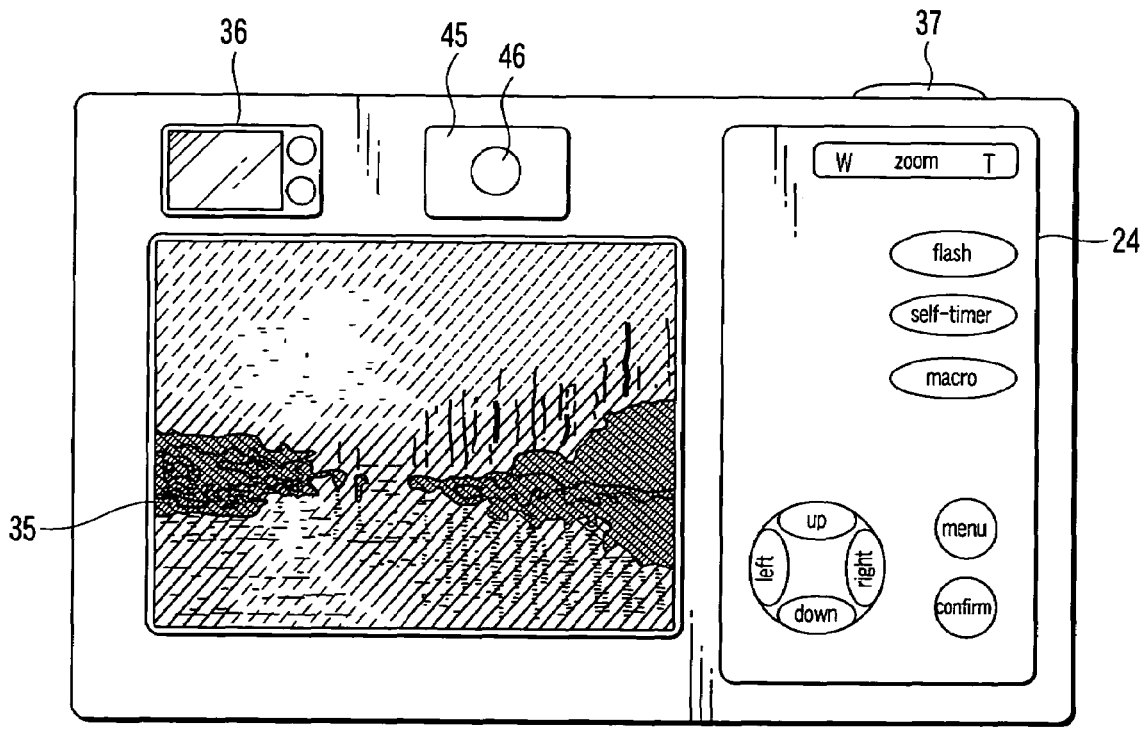

FIG. 24 shows a rear view of the digital camera 1 when used by a child. When the face recognition means 45 recognizes from a face image that the user is a child, operating members assigned to children are displayed on the input unit 24. As a result, in FIG. 25, the operating members are displayed in a form easy for children to understand (e.g., words simple enough for children to understand).

Figure 25:
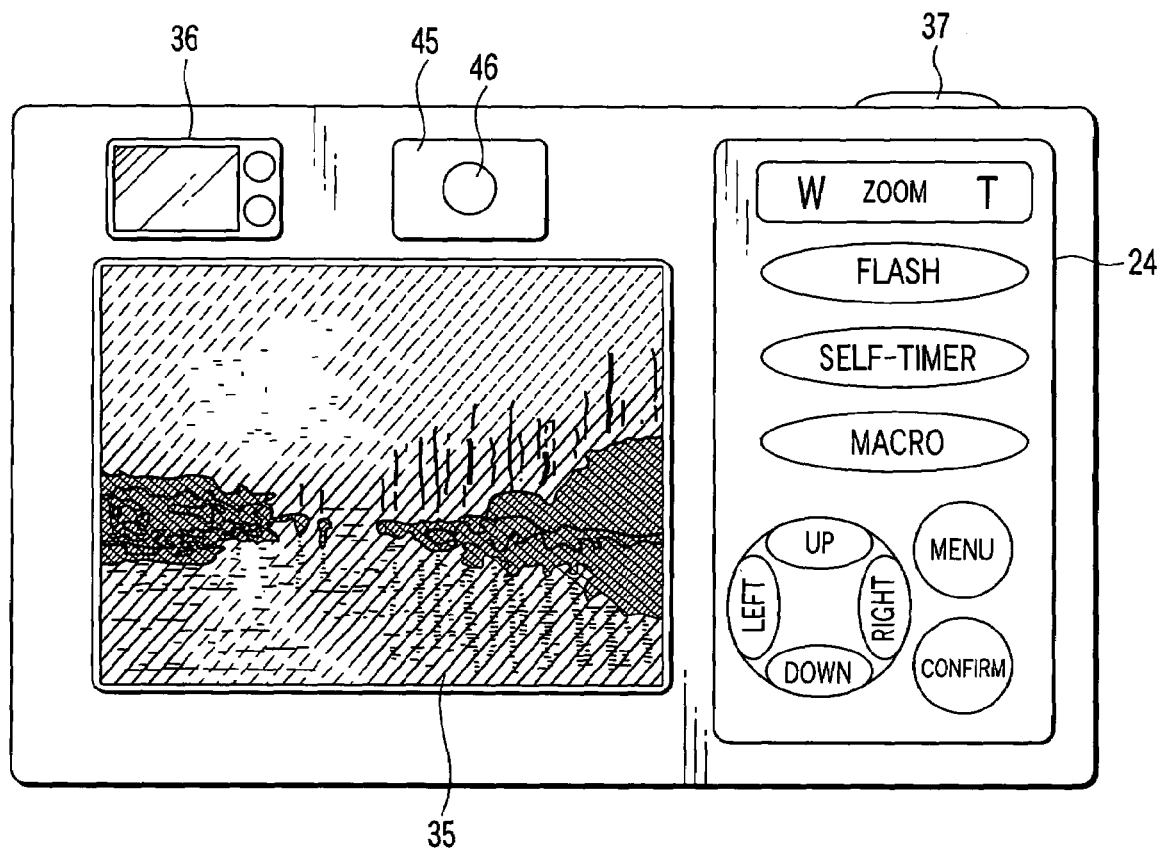

FIG. 25 shows a rear view of the digital camera 1 when used by an old person. When the face recognition means 45 recognizes from a face image that the user is an old person, operating members assigned to old persons are displayed on the input unit 24. As a result, in FIG. 25, the operating members are displayed using large characters.

As described above, the display control devices of the respective embodiments have the following features:

(1) The inexperienced user mode and the advanced user mode are prepared. Different operating systems are caused to appear according to the modes. In the inexperienced user mode, operating members associated with basic functions, such as flash, self-timer, and macro, are displayed. In the advanced user mode, in addition to the operating members associated with basic functions, operating members, such as jog dial, menu, OK, exposure compensation, white balance, etc., are displayed.

(2) User identification means is provided. When a user is identified, a corresponding operating system is caused to appear. The methods of user identification include fingerprint recognition, voiceprint recognition, eye crest recognition, and face recognition. The times to identify the user include the power-on time, the menu operation time, and the time when the user grips the camera. The operating system for an identified user may be displayed on the basis of preset data. Alternatively, frequently-used operating buttons may be displayed as the result of learning by the camera.

(3) A group to which the user belongs is identified. An operating system for that group is caused to appear. For example, voice recognition means is used and the age group or sex of the user is identified on the basis of recognized voice. Operating buttons for the group to which the user belongs are displayed on the input unit.

The display control devices thus configured can offer an operating system suitable for each user, allowing him or her to perform operations associated with image capture or playback with ease. The features described in (1), (2) and (3) may be combined appropriately.

The functions described in each of the embodiments may be implemented in hardware or software. In the case of software, a program in which the functions are described is read into a computer. Furthermore, each function may be implemented by choosing either of hardware or soft ware.

Moreover, each function can also be implemented by reading a program stored in a recording medium into a computer. The recording medium may have any form of recording provided that it is a program-recordable and computer-readable one.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display control device having a pointing device adapted to perform an operation associated with image capture or playback comprising:
    mode setting means for setting at least one of operation modes of recording, playback and communication;
    identification information obtaining means for obtaining identification information to identify the user of the display control device;
    operating member display means for displaying operating members corresponding to the pointing device in positions corresponding to the pointing device;
    storage means for storing data concerning a plurality of operating members different in functions, display forms and display positions;
    operating member setting means for extracting data concerning operating members on the basis of the identification information obtained by the identification information obtaining means and the operation mode set by the mode setting means, and setting the stored display form or display position for the operating members to be displayed on the operating member display means; and
    operation input control means for associating the functions of the operating members displayed on the operating member display means with the input position and input operation of the pointing device.

2. The display control device according to claim 1, wherein the identification information obtaining means obtains the identification information on the basis of a predetermined operation of a user identification switch.

3. The display control device according to claim 1, further comprising biological information detecting means for detecting biological information, and wherein the identification information obtaining means obtains the identification information on the basis of the biological information.

4. The display control device according to claim 1, wherein the display function is restricted on the basis of the identification information.

5. The display control device according to claim 1, further comprising an image display unit which displays an image which is to be captured or which has been captured or played back, and wherein the operating member display means displays the operating members in the vicinity of the image display unit.

6. The display control device according to claim 1, wherein the operating member display means displays the operating members in a staggered form.

7. The display control device according to claim 1, further comprising an image display unit which displays an image which is to be captured or which has been captured or played back, and wherein the operating member display means displays information associated with operations of image capture or playback on the image display means.

8. The display control device according to claim 1, wherein, when the mode setting means changes the operation modes, the operating member display means displays operating members corresponding to a new operation mode.

9. The display control device according to claim 1, wherein the mode setting means includes setting of an image-capture mode, and the data concerning the operating members stored in the storing means includes data to display the operating members of the same function in different display forms or display positions in accordance with at least the identification information obtained by the identification information obtaining means.

10. A display control device having a pointing device adapted to perform an operation associated with image capture or playback comprising:

a mode setting unit which sets at least one of operation modes of recording, playback and communication;

an identification information obtaining unit which obtains identification information to identify the user of the display control device;

an operating member display unit which displays operating members corresponding to the pointing device in positions corresponding to the pointing device;

a storage unit which stores data concerning a plurality of operating members different in functions, display forms and display positions;

an operating member setting unit which extracts data concerning operating members on the basis of the identification information obtained by the identification information obtaining unit and the operation mode set by the mode setting unit, and sets the stored display form or display position for the operating members to be displayed on the operating member display unit; and an operation input control unit which associates the functions of the operating members displayed on the operating member display unit with the input position and input operation of the pointing device.

11. A display control method for use with a display control device having a pointing device adapted to perform an operation associated with image capture or playback comprising the steps of:

setting at least one of operation modes of recording, playback and communication;

obtaining identification information to identify the user of the display control device;

displaying operating members corresponding to the pointing device in positions corresponding to the pointing device;

storing data concerning a plurality of operating members different in functions, display forms and display positions;

extracting data concerning operating members on the basis of the identification information obtained by the identification information obtaining step and the operation mode set by the mode setting step, and setting the stored display form or display position for the operating members to be displayed in the displaying step; and associating the functions of the operating members displayed in the displaying step with the input position and input operation of the pointing device.

* * * * *